(12) United States Patent
Pickle et al.

(10) Patent No.: US 12,013,140 B2
(45) Date of Patent: Jun. 18, 2024

(54) SYSTEM AND METHOD FOR MODULATING HOT GAS REHEAT UTILIZING MULTIPLE COMPRESSOR SYSTEMS

(71) Applicant: Johnson Controls Tyco IP Holdings LLP, Milwaukee, WI (US)

(72) Inventors: Stephen B. Pickle, Norman, OK (US); John T. Knight, Moore, OK (US)

(73) Assignee: JOHNSON CONTROLS TYCO IP HOLDNGS LLP, Milwaukee, WI (US)

( * ) Notice: Subject to any disclaimer, the term of this patent is extended or adjusted under 35 U.S.C. 154(b) by 113 days.

(21) Appl. No.: 17/943,454

(22) Filed: Sep. 13, 2022

(65) Prior Publication Data
US 2023/0003415 A1    Jan. 5, 2023

Related U.S. Application Data

(63) Continuation of application No. 16/451,916, filed on Jun. 25, 2019, now Pat. No. 11,473,809.

(60) Provisional application No. 62/808,503, filed on Feb. 21, 2019.

(51) Int. Cl.
| | |
|---|---|
| F24F 11/30 | (2018.01) |
| F24F 3/044 | (2006.01) |
| F24F 3/153 | (2006.01) |
| F24F 5/00 | (2006.01) |
| F24F 11/00 | (2018.01) |
| F24F 11/54 | (2018.01) |
| F24F 11/56 | (2018.01) |
| F24F 11/86 | (2018.01) |
| F25B 5/02 | (2006.01) |

(Continued)

(52) U.S. Cl.
CPC .............. *F24F 11/86* (2018.01); *F24F 3/044* (2013.01); *F24F 3/153* (2013.01); *F24F 5/001* (2013.01); *F24F 11/0008* (2013.01); *F24F 11/30* (2018.01); *F24F 11/54* (2018.01); *F24F 11/56* (2018.01); *F25B 5/02* (2013.01); *F25B 6/02* (2013.01); *F25B 41/20* (2021.01)

(58) Field of Classification Search
CPC .. F25B 6/02; F25B 41/20; F25B 49/02; F25B 2400/0403
See application file for complete search history.

(56) References Cited

U.S. PATENT DOCUMENTS

| | | | |
|---|---|---|---|
| 7,290,399 | B2 | 11/2007 | Taras et al. |
| 7,523,623 | B2 | 4/2009 | Taras et al. |
| 7,975,495 | B2 | 7/2011 | Voortis et al. |

(Continued)

*Primary Examiner* — Nelson J Nieves
(74) *Attorney, Agent, or Firm* — Fletcher Yoder, P.C.

(57) ABSTRACT

A system for modulating hot gas reheat operation of a heating, ventilation, and/or air conditioning (HVAC) system with multiple compressors, wherein the HVAC system is configured to regulate air provided to multiple zones. The system includes a controller configured to respond to a call for dehumidification in the absence of a call for cooling by sequentially energizing a first compressor of the multiple compressors in a reheat mode of the first compressor, energizing a second compressor of the multiple compressors in a cooling mode of the second compressor, energizing a third compressor of the multiple compressors in a reheat mode of the third compressor initially at full capacity, and energizing a fourth compressor of the multiple compressors in a cooling mode of the fourth compressor.

20 Claims, 9 Drawing Sheets

(51) Int. Cl.
*F25B 6/02* (2006.01)
*F25B 41/20* (2021.01)

(56) References Cited

U.S. PATENT DOCUMENTS

| | | |
|---|---|---|
| 2004/0089015 A1 | 5/2004 | Knight et al. |
| 2015/0013356 A1* | 1/2015 | Karkhanis ................ F24F 11/46 62/90 |
| 2019/0032979 A1* | 1/2019 | Kasamatsu ......... F28D 20/0056 |
| 2020/0378630 A1* | 12/2020 | Kalambe ................. F25B 49/02 |
| 2022/0106513 A1* | 4/2022 | Itano ...................... C09K 5/045 |

* cited by examiner

SYSTEM AND METHOD FOR MODULATING HOT GAS REHEAT UTILIZING MULTIPLE COMPRESSOR SYSTEMS

CROSS REFERENCE TO RELATED APPLICATIONS

This application is a continuation application of U.S. patent Ser. No. 16/451,916, entitled "SYSTEM AND METHOD FOR MODULATING HOT GAS REHEAT UTILIZING MULTIPLE COMPRESSOR SYSTEMS," filed Jun. 25, 2019, which claims priority from and the benefit of U.S. Provisional Application Ser. No. 62/808,503, entitled "SYSTEM AND METHOD FOR MODULATING HOT GAS REHEAT UTILIZING MULTIPLE COMPRESSOR SYSTEMS," filed Feb. 21, 2019, each of which is hereby incorporated by reference in its entirety for all purposes.

BACKGROUND

The present disclosure relates generally to heating, ventilation, and/or air conditioning (HVAC) systems, and specifically, relates to modulating hot gas reheat utilizing multiple compressor systems.

This section is intended to introduce the reader to various aspects of art that may be related to various aspects of the present disclosure, which are described below. This discussion is believed to be helpful in providing the reader with background information to facilitate a better understanding of the various aspects of the present disclosure. Accordingly, it should be understood that these statements are to be read in this light, and not as admissions of prior art.

A wide range of applications exist for HVAC systems. For example, residential, light commercial, commercial, and industrial systems are used to control temperatures and air quality in residences and buildings. Such systems often are dedicated to either heating or cooling, although systems are common that perform both of these functions. Very generally, these systems operate by implementing a thermal cycle in which fluids are heated and cooled to provide the desired temperature in a controlled space, typically the inside of a residence or building. Similar systems are used for vehicle heating and cooling, as well as for general refrigeration. In many HVAC systems, a reheat heat exchanger may be used to reheat supply air that is overcooled by an evaporator heat exchanger.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system for modulating hot gas reheat operation of a heating, ventilation, and/or air conditioning (HVAC) system with multiple compressors, wherein the HVAC system is configured to regulate air provided to multiple zones. The system includes a controller configured to respond to a call for dehumidification in the absence of a call for cooling by sequentially energizing a first compressor of the multiple compressors in a reheat mode of the first compressor, energizing a second compressor of the multiple compressors in a cooling mode of the second compressor, energizing a third compressor of the multiple compressors in a reheat mode of the third compressor initially at full capacity, and energizing a fourth compressor of the multiple compressors in a cooling mode of the fourth compressor.

In another embodiment, a system for modulating hot gas reheat operation of a HVAC system is provided, wherein the HVAC system is configured to regulate air provided to multiple zones. The system includes a first compressor coupled to both a first hot gas reheat circuit including a reheat coil and a first cooling circuit including a first condenser and an evaporator. The system also includes a second compressor coupled to a second cooling circuit including a second condenser and the evaporator. The system further includes a third compressor coupled to both a second gas reheat circuit including the reheat coil and a third cooling circuit including a third condenser and the evaporator. The system still further includes a fourth compressor coupled to a fourth cooling circuit including a fourth condenser and the evaporator. The system even further includes a first multi-directional reheat valve disposed at a first junction between the first hot gas reheat circuit and the first cooling circuit. The system yet further includes a second multi-directional reheat valve disposed at a second junction between the second hot gas reheat circuit and the third cooling circuit.

In a further embodiment, a system for modulating hot gas reheat operation of a heating, ventilation, and/or air conditioning (HVAC) system is provided, wherein the HVAC system is configured to regulate air provided to multiple zones. The system includes a controller configured to respond to a call for dehumidification in the absence of a call for cooling by sequentially energizing a first compressor in a reheat mode of the first compressor, energizing a second compressor in a cooling mode of the second compressor, energizing a third compressor in a reheat mode of the third compressor initially at full capacity, and energizing a fourth compressor in a cooling mode of the fourth compressor. The controller is configured, upon energizing the third compressor in the reheat mode initially at full capacity, to monitor a temperature of the supply and return air to determine if the temperature of the supply air is at a neutral temperature, and when the temperature of the supply air is not at the neutral temperature, to provide a modulating signal to a multi-directional reheat valve to adjust a capacity of the reheat mode of the third compressor.

BRIEF DESCRIPTION OF THE DRAWINGS

Various aspects of this disclosure may be better understood upon reading the following detailed description and upon reference to the drawings in which.

DETAILED DESCRIPTION

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present disclosure is directed to a heating, ventilation, and/or air conditioning (HVAC) system that includes a plurality of compressors and a plurality refrigeration circuits. Some of the compressors may be coupled with both a cooling circuit and a reheat circuit, while other compressors may be coupled with only a cooling circuit. The HVAC system may modulate a hot gas reheat sequence utilizing the plurality of compressors and the plurality of refrigeration circuits to provide dehumidification in the absence of an initial call for cooling. In particular, the HVAC system may be configured to utilize the plurality of compressors and the plurality of refrigeration circuits to achieve maximum dehumidification at neutral air by adjusting the supply air from multiple zones towards a neutral point while avoiding the cooling effect that typically occurs in typical HVAC systems (e.g., having a single reheat circuit and a single cooling circuit). Modulation of the heat gas reheat valve via the hot gas reheat sequence described below enables the supply air to be adjusted toward the neutral point. In addition, the hot gas reheat sequence with the plurality of compressors and the plurality of refrigeration circuits enables full modulation (i.e., 0 to 100 percent) of the hot gas reheat operation.

Figure 1:
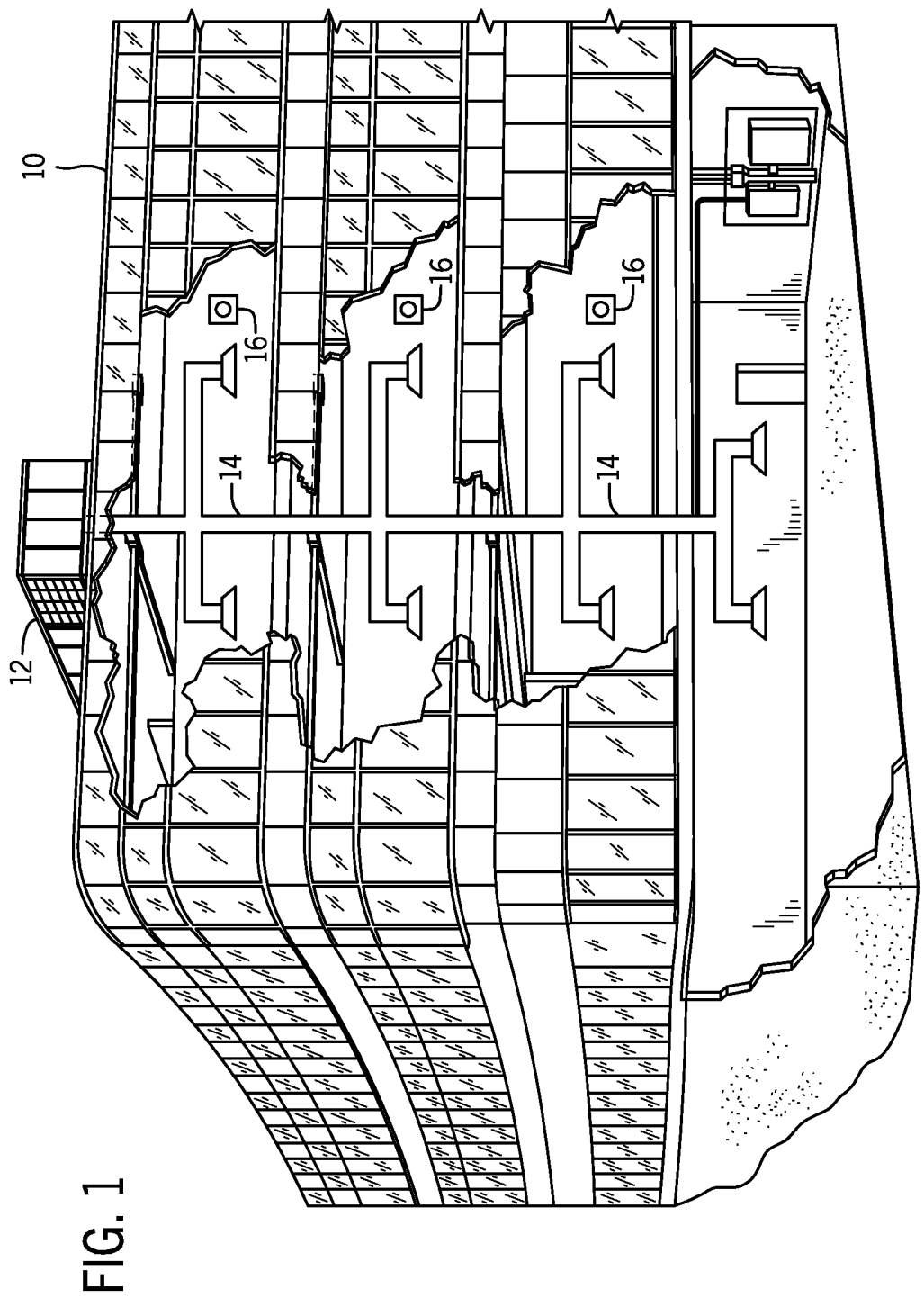
FIG. 1 is a schematic of an embodiment of an environmental control system for building environmental management that may employ one or more HVAC units, in accordance with an aspect of the present disclosure.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. Components or parts of an HVAC system may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An HVAC system is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10 (e.g., different zones). In certain embodiments, the HVAC unit 12 may be a heat pump that provides both heating and cooling to the building (and its different zones) with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
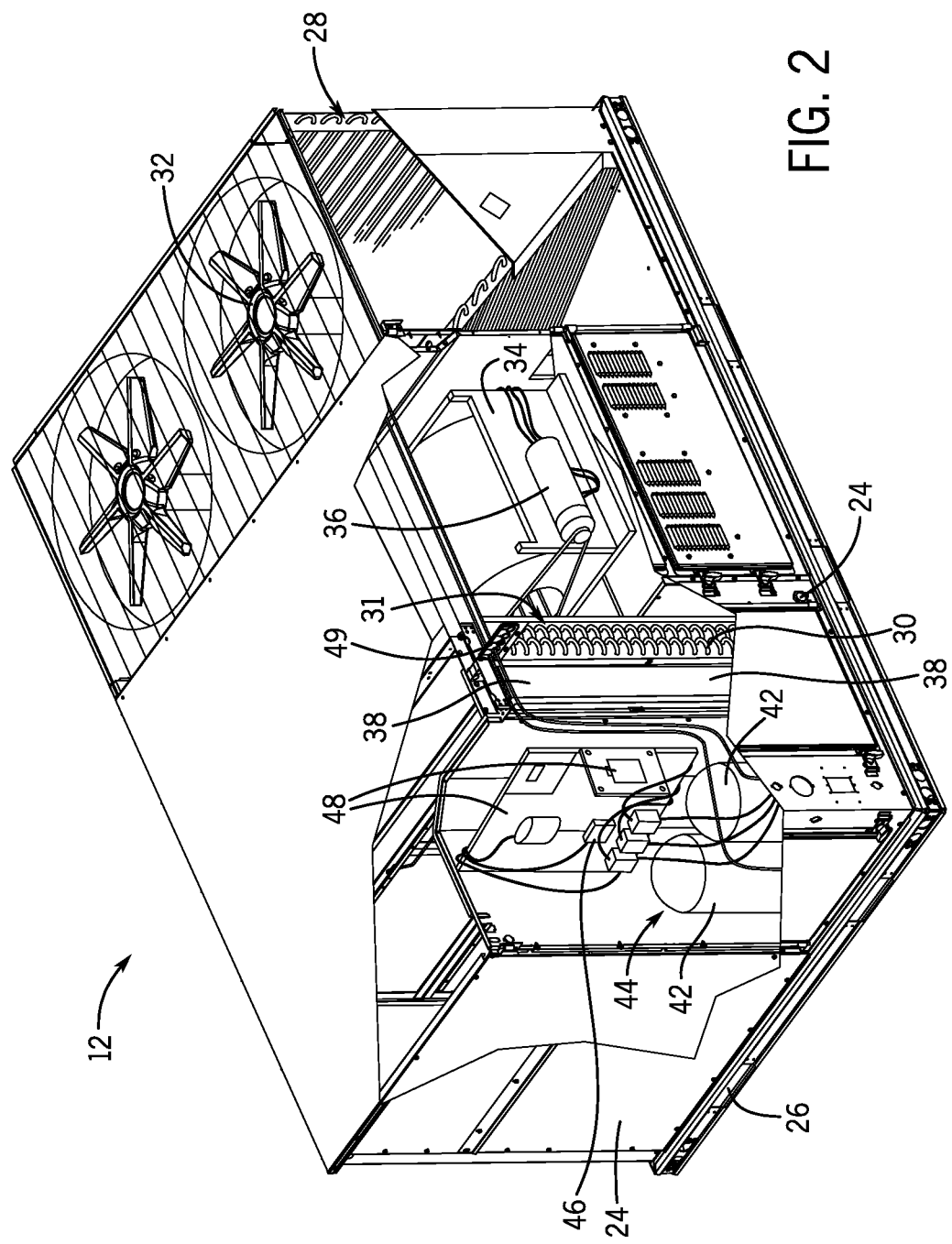
FIG. 2 is a perspective view of an embodiment of a packaged HVAC unit that may be used in the environmental control system of FIG. 1, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
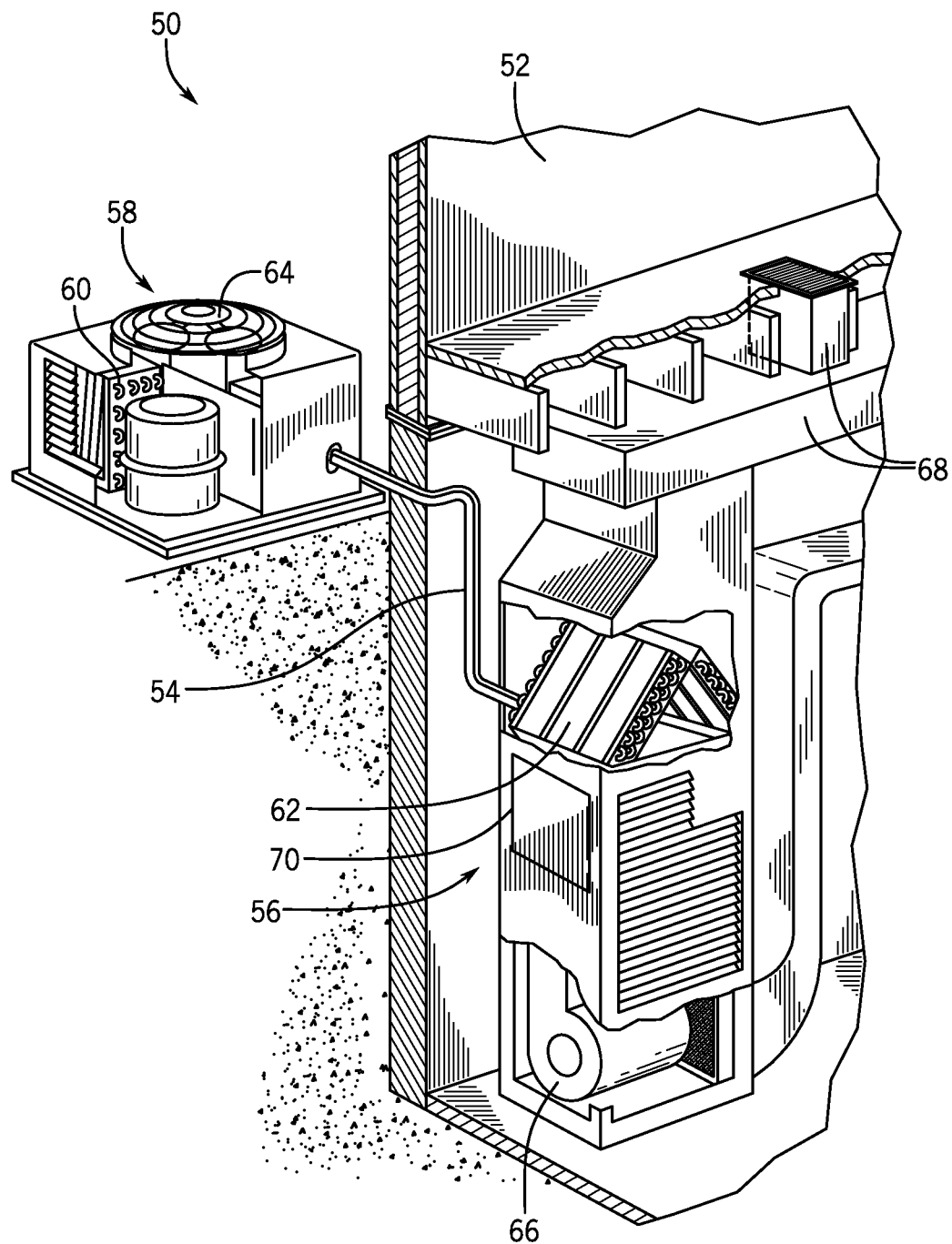
FIG. 3 is a schematic of an embodiment of a residential, split heating and cooling system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

Figure 4:
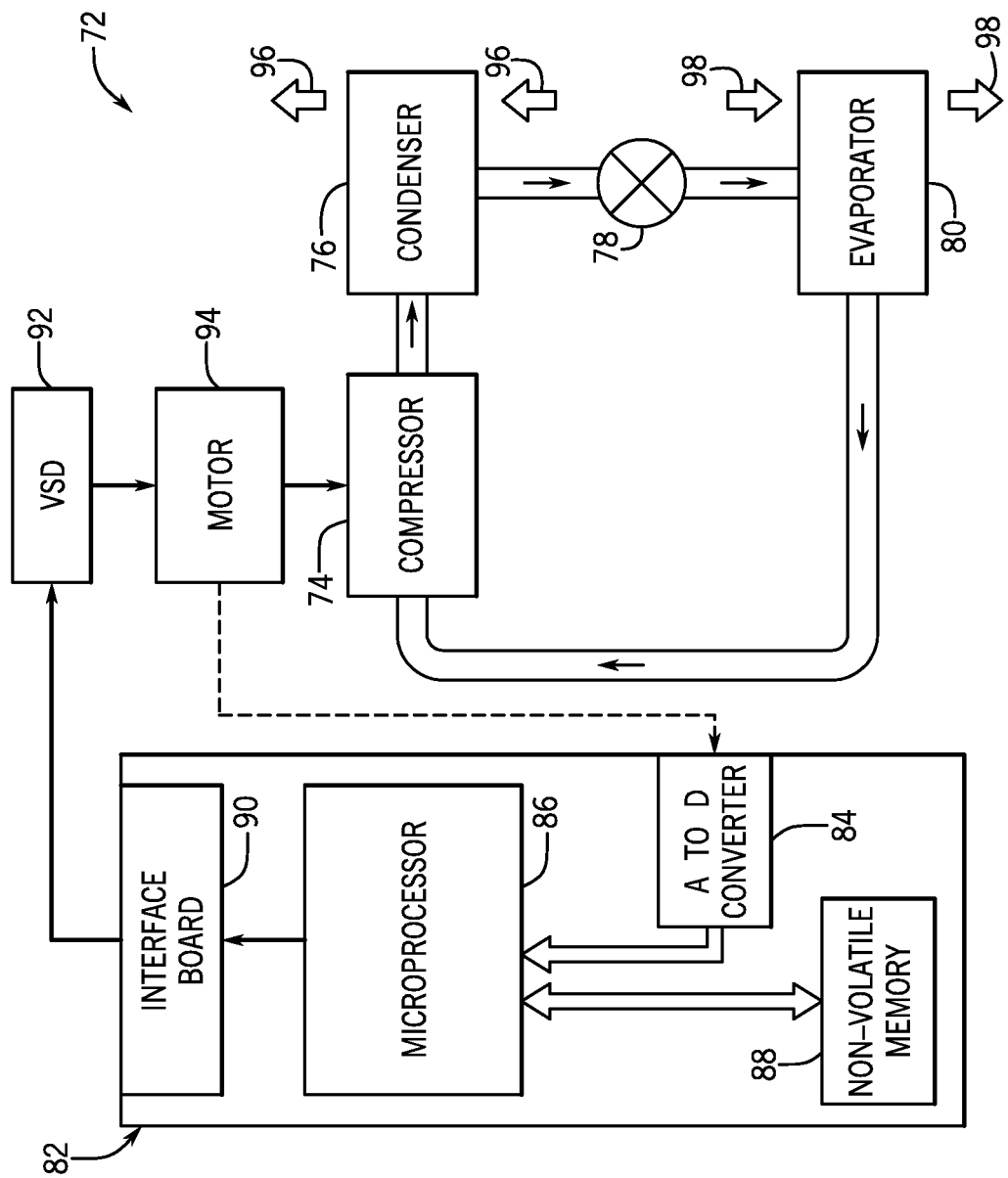
FIG. 4 is a schematic of an embodiment of a vapor compression system that can be used in any of the systems of FIGS. 1-3, in accordance with an aspect of the present disclosure.

FIG. 4 is an embodiment of a vapor compression system 72 that can be used in any of the systems described above. The vapor compression system 72 may circulate a refrigerant through a circuit starting with a compressor 74. The circuit may also include a condenser 76, an expansion valve(s) or device(s) 78, and an evaporator 80. The vapor compression system 72 may further include a control panel 82 that has an analog to digital (A/D) converter 84, a microprocessor 86, a non-volatile memory 88, and/or an interface board 90. The control panel 82 and its components may function to regulate operation of the vapor compression system 72 based on feedback from an operator, from sensors of the vapor compression system 72 that detect operating conditions, and so forth.

In some embodiments, the vapor compression system 72 may use one or more of a variable speed drive (VSDs) 92, a motor 94, the compressor 74, the condenser 76, the expansion valve or device 78, and/or the evaporator 80. The motor 94 may drive the compressor 74 and may be powered by the variable speed drive (VSD) 92. The VSD 92 receives alternating current (AC) power having a particular fixed line voltage and fixed line frequency from an AC power source, and provides power having a variable voltage and frequency to the motor 94. In other embodiments, the motor 94 may be powered directly from an AC or direct current (DC) power source. The motor 94 may include any type of electric motor that can be powered by a VSD or directly from an AC or DC power source, such as a switched reluctance motor, an induction motor, an electronically commutated permanent magnet motor, or another suitable motor.

The compressor 74 compresses a refrigerant vapor and delivers the vapor to the condenser 76 through a discharge passage. In some embodiments, the compressor 74 may be a centrifugal compressor. The refrigerant vapor delivered by the compressor 74 to the condenser 76 may transfer heat to a fluid passing across the condenser 76, such as ambient or environmental air 96. The refrigerant vapor may condense to a refrigerant liquid in the condenser 76 as a result of thermal heat transfer with the environmental air 96. The liquid refrigerant from the condenser 76 may flow through the expansion device 78 to the evaporator 80.

The liquid refrigerant delivered to the evaporator 80 may absorb heat from another air stream, such as a supply air stream 98 provided to the building 10 or the residence 52. For example, the supply air stream 98 may include ambient or environmental air, return air from a building, or a combination of the two. The liquid refrigerant in the evaporator 80 may undergo a phase change from the liquid refrigerant to a refrigerant vapor. In this manner, the evaporator 80 may reduce the temperature of the supply air stream 98 via thermal heat transfer with the refrigerant. Thereafter, the vapor refrigerant exits the evaporator 80 and returns to the compressor 74 by a suction line to complete the cycle.

In some embodiments, the vapor compression system 72 may further include a reheat coil in addition to the evaporator 80. For example, the reheat coil may be positioned downstream of the evaporator relative to the supply air stream 98 and may reheat the supply air stream 98 when the supply air stream 98 is overcooled to remove humidity from the supply air stream 98 before the supply air stream 98 is directed to the building 10 or the residence 52.

Figure 7:
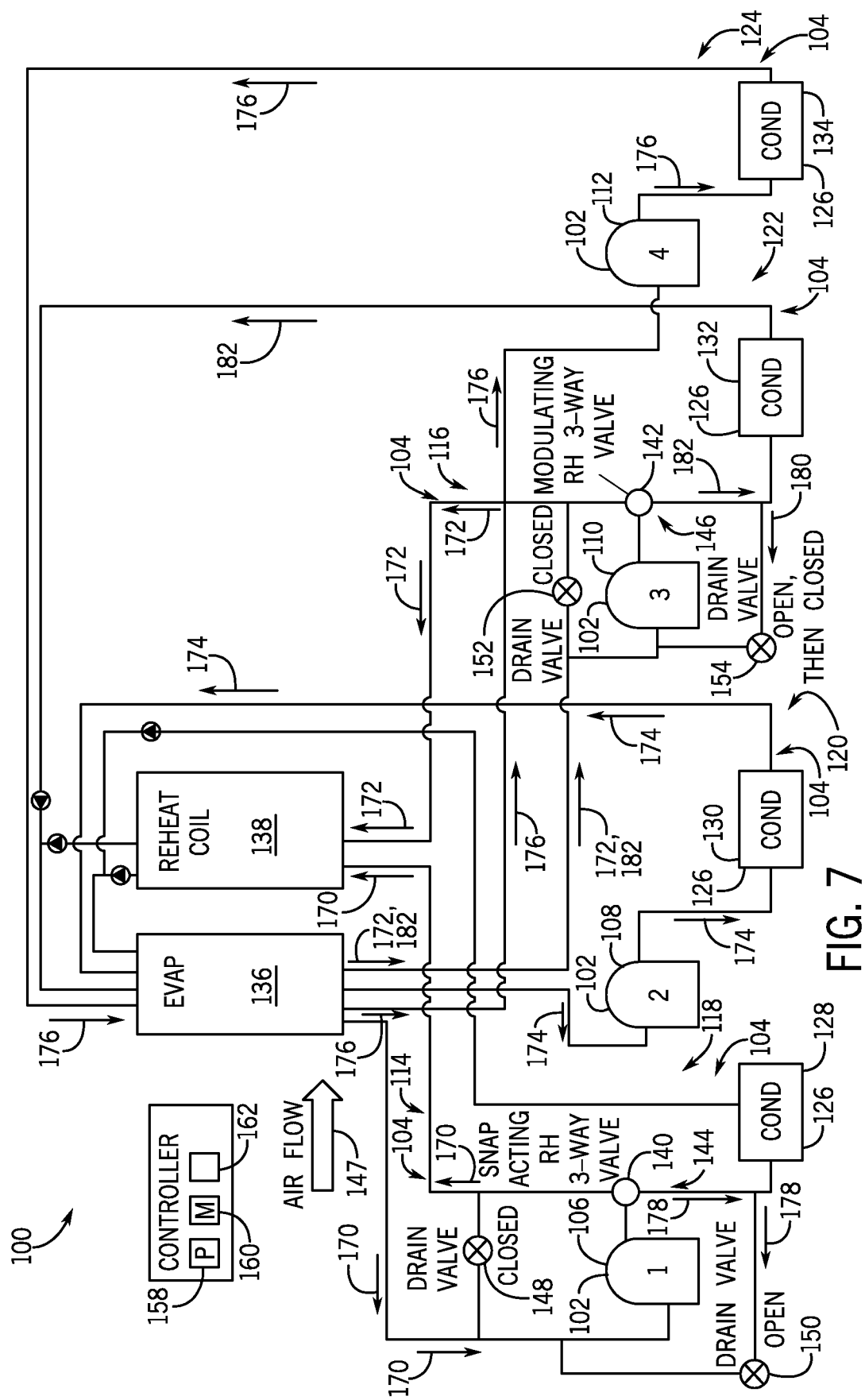
FIG. 7 is a schematic of an embodiment of the HVAC system of FIG. 5 with a first compressor in reheat mode, a third compressor modulating in reheat mode, and second and fourth compressors in cooling mode, in accordance with aspects of the present disclosure.
Figure 8:
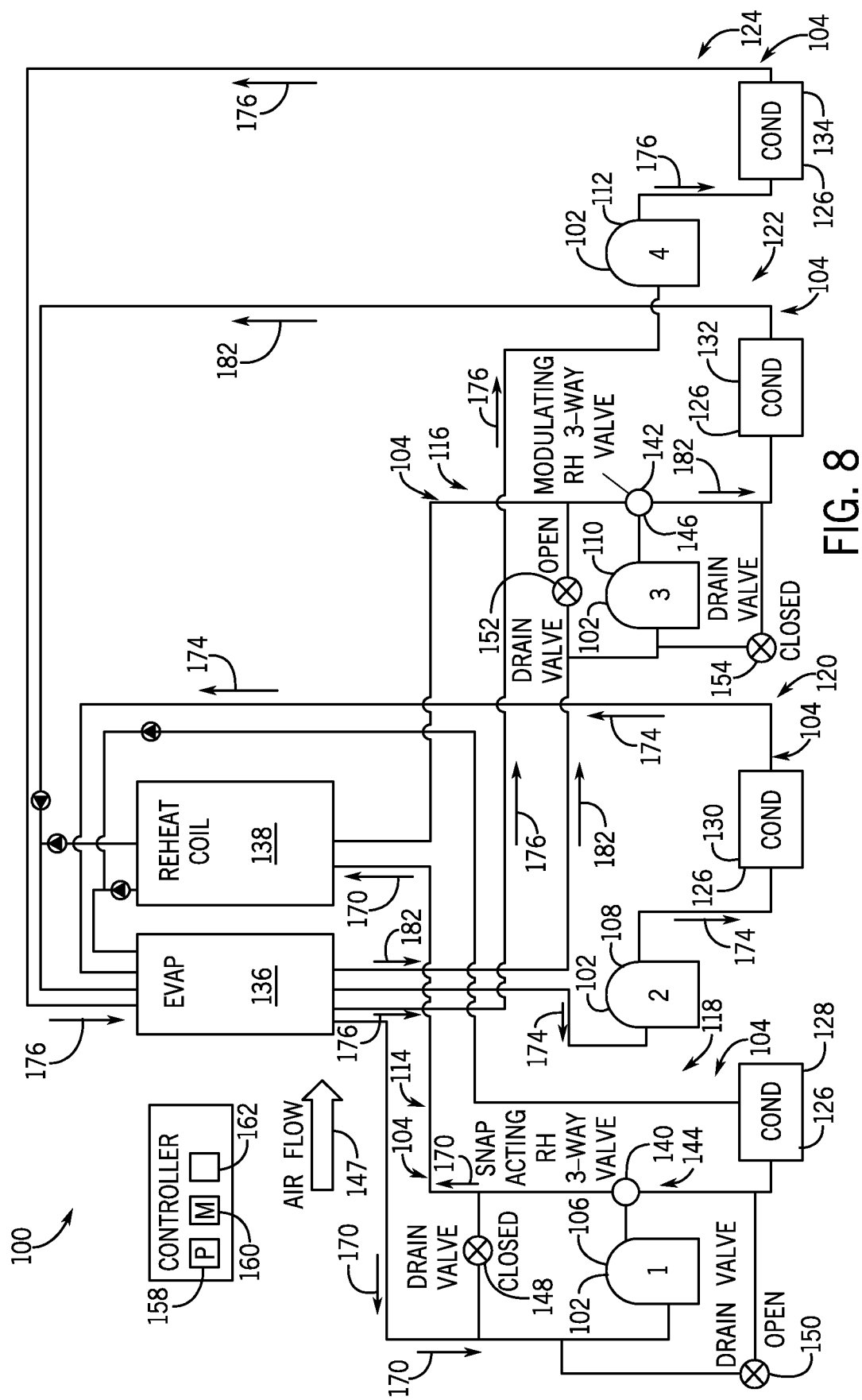
FIG. 8 is a schematic of an embodiment of the HVAC system of FIG. 5 with a first compressor in reheat mode and second, third, and fourth compressors in cooling mode, in accordance with aspects of the present disclosure.

As discussed below with respect to FIGS. 5, 7, and 8, a heating, ventilation, and/or air conditioning (HVAC) system 100 (e.g., regulating the air provided to a plurality of zones), such as the HVAC unit 12, the residential heating and cooling system 50, and/or the vapor compression system 72, may be an air conditioning system that includes a plurality of compressors and a plurality of refrigeration circuits, where some of the refrigeration circuits are configured to function in a cooling operating mode and some of the refrigeration circuits are configured to function in a hot gas reheat (HGRH) operating mode, which may be referred to as a reheat mode. In the cooling operating mode, the HVAC system 100 may utilize a heat exchanger as an evaporator in order to condition air, such as by cooling and dehumidifying the air, and may provide the resulting conditioned air to a conditioned space. In the HGRH operating mode, the HVAC system 100 may utilize another heat exchanger as an HGRH heat exchanger. Some of the compressors may be coupled with both a cooling circuit and a reheat circuit, while other compressors may be coupled with only a cooling circuit. The HVAC system 100 may modulate a hot gas reheat sequence utilizing the plurality of compressors and the plurality of refrigeration circuits to provide dehumidification in the absence of an initial call for cooling. In particular, the HVAC system 100 may be configured to utilize the plurality of compressors and the plurality of refrigeration circuits to achieve maximum dehumidification at neutral air by adjusting the supply air for multiple zones towards a neutral point while avoiding the cooling effect that typically occurs in typical HVAC systems (e.g., having a single reheat circuit and a single cooling circuit). However, the HVAC system 100 is not precluded from being configured to drive humidity toward its lowest point even if a certain amount of cooling or heating may be tolerated. Modulation of the heat gas reheat valve via the hot gas reheat sequence described below enables the supply air to be adjusted toward the neutral point. In addition, the hot gas reheat sequence with the plurality of compressors and the plurality of refrigeration circuits enables full modulation (i.e., 0 to 100 percent) of the hot gas reheat operation.

Figure 5:
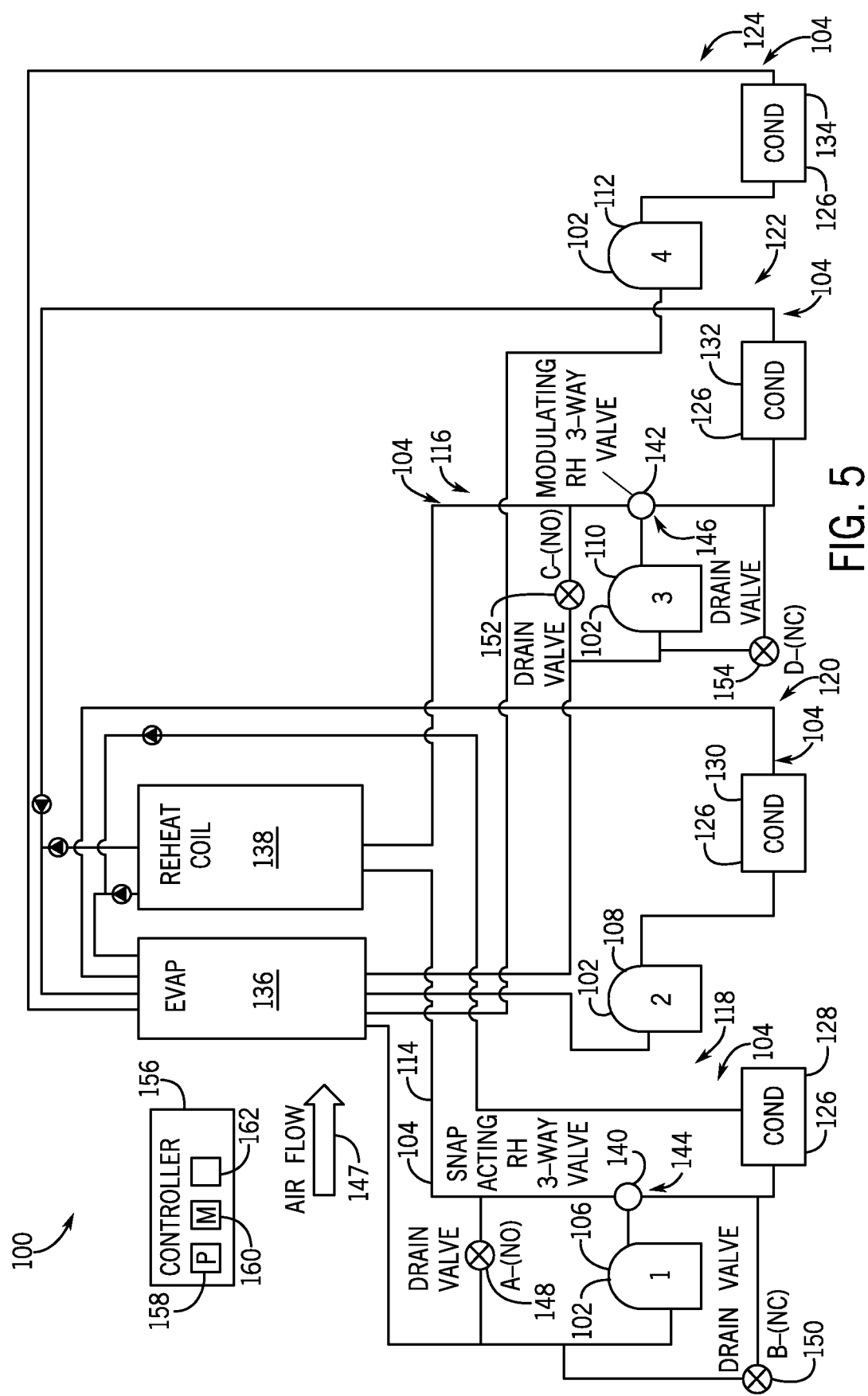
FIG. 5 is a schematic of an embodiment of an HVAC system having multiple compressors and multiple refrigeration circuits, in accordance with aspects of the present disclosure.

To illustrate, FIG. 5 is a schematic of an embodiment of the HVAC system 100. In some embodiments, the HVAC system 100 may be a rooftop HVAC unit. The HVAC system 100 includes a plurality of compressors 102 configured to flow refrigerant through a plurality of refrigeration circuits 104. The plurality of compressors 102 includes compressors 106, 108, 110, 112. Although multiple single compressors in conjunction with multiple refrigeration circuits are described, in certain embodiments, tandem compressors may be utilized. The plurality of refrigeration circuits 104 includes hot gas reheat circuits or reheat circuits 114, 116 and cooling circuits 118, 120, 122, 124. The compressor 106 is coupled to both the reheat circuit 114 and the cooling circuit 118, which the compressor 106 utilizes during reheat and cooling operations, respectively. The compressor 108 is coupled to the cooling circuit 120 and utilizes it during cooling operations. The compressor 110 is coupled to both reheat circuit 116 and the cooling circuit 122, which the compressor 110 utilizes during reheat and cooling operations, respectively. The compressor 112 is coupled to the cooling circuit 124 and utilizes it during cooling operations. The HVAC system 100 also includes a plurality of condensers 126. The plurality of condensers 126 include condensers 128, 130, 132, 134. Condenser 128, 130, 132, 134 are disposed along the respective cooling circuits 118, 120, 122, 124 downstream of the respective compressors 106, 108, 110, 112. The HVAC system 100 further includes a heat exchanger utilized as an evaporator 136 for conditioning air (e.g., cooling and dehumidifying the air) and a heat exchanger (e.g., reheat coil) as a HGRH heat exchanger 138. The HGRH heat exchanger 138 is coupled to the heating circuits 114, 116 downstream of the respective compressors 106, 110. The evaporator 136 is coupled to cooling circuits 118, 120, 122, 124 downstream of the respective condensers 128, 130, 132, 134. The evaporator 136 is coupled to the heating circuits 114, 116 downstream of the HGRH heat exchanger 138.

The HVAC system 100 even further includes valves 140, 142 (e.g., HGRH three-way or multi-directional valves). The HGRH valve 140 may be a snap acting valve and the HGRH valve 142 may be a modulating valve. The valve 140 is located at a junction 144 between the reheat circuit 114 and the cooling circuit 118. The valve 140 is configured to be operated to adjust a direction of flow of refrigerant to either the reheat circuit 114 or the cooling circuit 118 based on the operational mode of the compressor 106. Although a single modulating reheat valve (e.g., reheat valve 142) is described, in certain embodiments, multiple modulating reheat valves may be utilized. The valve 142 is located at a junction 146 between the reheat circuit 116 and the cooling circuit 122 (e.g., reheat mode or cooling mode). The valve 142 is configured to be operated to adjust a direction of flow of refrigerant to either the reheat circuit 116 or the cooling circuit 122 based on the operational mode of the compressor 110 (e.g., reheat mode or cooling mode).

When operating in cooling mode, the compressors 106, 108, 110, 112 may deliver refrigerant in a vaporous state to respective condensers 128, 130, 132, 134. The refrigerant flows through the coils of the condensers 128, 130, 132, 134, such that condensers 128, 130, 132, 134 places the refrigerant in a heat exchange relationship with an airflow flowing across coils of the condensers 128, 130, 132, 134. As such, the airflow absorbs heat from the refrigerant within the condensers 128, 130, 132, 134, and the refrigerant condenses into a liquid. The refrigerant then continues to flow along conduits through the respective cooling circuit 118, 120, 122, 124 to the evaporator 136, where the refrigerant interfaces with an airflow 147 to condition it (e.g., cool and/or dehumidify).

When operating in reheat mode (i.e., full or 100 percent capacity reheat mode), the compressors 106, 110 may deliver refrigerant through conduits along the reheat circuits 114, 116 to the HGRH heat exchanger 138, where the refrigerant interfaces with the airflow 147 to heat it to a suitable temperature before the airflow 147 is supplied to the conditioned space (e.g., zone). As mentioned above, the valve 142 may be a modulating valve. Thus, the valve 142, when the compressor 110 is operating in partial heat mode (i.e., less than 100 percent), may be configured to open partially so as to selectively enable a partial flow of refrigerant therethrough along the reheat circuit 116 to flow toward the HGRH heat exchanger 138. The remaining flow of refrigerant from the compressor 110 may be diverted along the cooling circuit 122 to condenser 126 and the evaporator 136.

The HVAC system 100 still further includes valves (e.g., solenoid valves such as drain valves) 148, 150, 152, 154. Valves 148, 150 are configured to be adjusted to shift refrigerant between the reheat circuit 114 and the cooling circuit 118 or vice versa when switching between the reheat mode and the cooling mode. Valves 152, 154 are configured to be adjusted to shift refrigerant between the reheat circuit 116 and the cooling circuit 122 when switching between the reheat mode and the cooling mode. In a de-energized state, the valves 148, 152 are normally open and the valves 150, 154 are normally closed.

Particularly, the positions of the valves 140, 142, 148, 150, 152, 154 may be adjusted in response to signals output by a controller 156, such as the control panel 82 or an automation controller. The controller 156 may employ a processor 158, which may represent one or more processors, such as an application-specific processor. The controller 156 may also include a memory device 160 for storing instructions executable by the processor 158 to perform the methods and control actions described herein for the HVAC system 100. The processor 158 may include one or more processing devices, and the memory 160 may include one or more tangible, non-transitory, machine-readable media. By way of example, such machine-readable media can include RAM, ROM, EPROM, EEPROM, CD-ROM, or other optical disk storage, magnetic disk storage or other magnetic storage devices, or any other medium which can be used to carry or store desired program code in the form of machine-executable instructions or data structures and which can be accessed by the processor 158 or by any general purpose or special purpose computer or other machine with a processor. Indeed, the controller 156 may control a flow control system, which includes the valves 140, 142, 148, 150, 152, 154, to control a direction of refrigerant within each refrigeration circuit 104. The controller 156 may also control which operating mode (e.g., reheat operating mode or cooling operating mode) the compressors 102 may operate in in response to calls (e.g., dehumidification call, cooling call) from different zones for which air is provided by the HVAC system 100 as described below.

The controller 156 may further include communication circuitry 162 configured to provide intercommunication between the system/components of the HVAC system 100. In some embodiments, the communication circuitry 162 may communicate through a wireless network, such as wireless local area networks (WLAN), wireless wide area networks (WWAN), near field communication (NFC), Wi-Fi, and/or Bluetooth. In some embodiments, the communication circuitry 162 may communicate through a wired network such as local area networks (LAN), or wide area networks (WAN).

Figure 6:
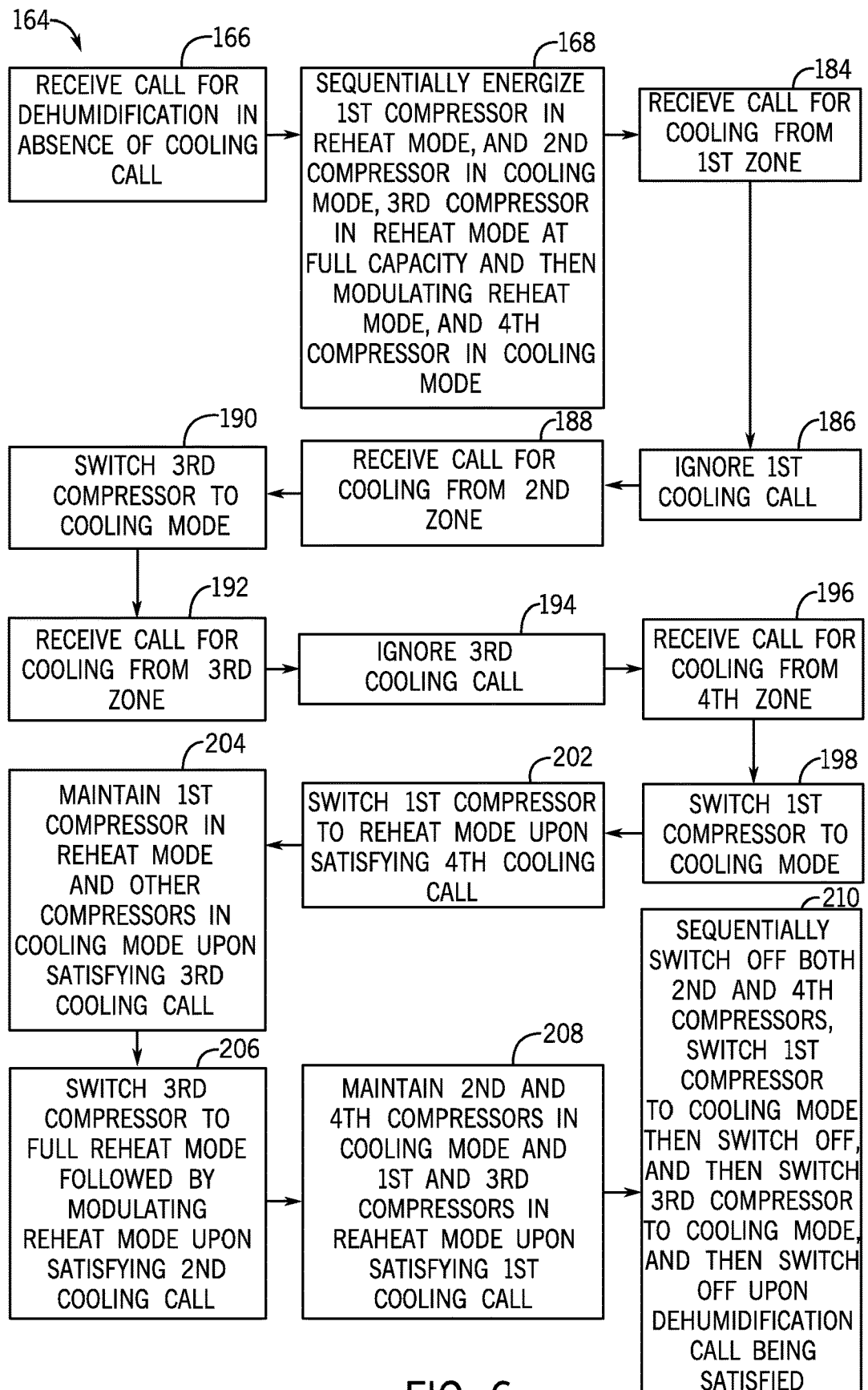
FIG. 6 is a flowchart of an embodiment of a method for a hot gas reheat sequence of operation for the HVAC system of FIG. 5, in accordance with aspects of the present disclosure.

FIG. 6 is a flowchart of an embodiment of a method 164 for a hot gas reheat sequence of operation for the HVAC system 100 of FIG. 5. The steps of the method 164 may be performed by the controller 156 (e.g., the control panel 82 or an automation controller) of the HVAC system 100 described above. One or more of the steps of the method 164 may be performed simultaneously and/or in a different order. The method 164 includes receiving a call for dehumidification in the absence of a cooling call (block 166). In response to the dehumidification call, the method 164 includes sequentially (e.g., with each step separated by a few seconds) energizing the compressor 106 in reheat mode (e.g., at full capacity or 100 percent operating capacity), energizing the compressor 108 in cooling mode, energizing the compressor 110 in reheat mode initially at full capacity, and energizing the compressor 112 in cooling mode (block 168). As depicted in FIG. 7, refrigerant will flow along the reheat circuits 114, 116 and the cooling circuits 120 and 124 as indicated by arrows 170, 172, 174, and 176, respectively. With the compressor 106 at full capacity, the reheat valve 140, is completely open to enable the entire flow of refrigerant along the reheat circuit 114, while closed to block flow refrigerant along the cooling circuit 118. During energization of the compressor 106 into reheat mode, the valve 148 is energized to close the valve 148 and then the valve 150 is energized to open the valve 150. This ensures that any refrigerant in the cooling circuit 118 is switched to reheat circuit 114 as indicated by arrows 178. With the compressor 110 initially at full capacity, the reheat valve 142 is completely open to enable the entire flow of refrigerant along the reheat circuit 116, while closed to block flow of refrigerant along the cooling circuit 122. During energization of the compressor 110 into the reheat mode initially at full capacity, the valve 152 is energized to close the valve 152 and then the valve 154 is energized to initially open the valve 154. This ensures that any refrigerant in the cooling circuit 122 is switched to the reheat circuit 116 as indicated by arrows 180. At this point, the controller 156 monitors a temperature of the supply and return air to determine if the temperature of the supply air is at a neutral temperature. When the temperature of the supply air is not at a neutral temperature, the controller 156 provides a modulating signal to the reheat valve 142 to adjust a capacity of the reheat mode of the compressor 110 to an operating reheat capacity between 0 and 100 percent. Once the modulating signal is sent to the reheat valve 142, the valve 154 is de-energized to close the valve 154 and the compressor 110 is then modulating in the reheat mode. If compressor 110 is operating at less than full capacity, the reheat valve 142 is only partially open to enable a portion of refrigerant to flow along the reheat circuit 116, while the reheat valve 142 is also partially open to enable the remaining portion of refrigerant to flow along the cooling circuit 122 as indicated by arrow 182.

The method 164 also includes, in addition to the previous dehumidification call, receiving a cooling call from a first zone that the HVAC system 100 provides air to (block 184). In response, the method 164 includes ignoring the cooling call from the first zone (block 186) and taking no action. Thus, the controller 156 maintains the compressor 106 in the reheat mode (e.g., at full capacity), the compressors 108, 112 in the cooling mode, and the compressor 110 modulating in the reheat mode.

The method 164 further includes, in addition to the previous dehumidification call and the cooling call from the first zone, receiving a cooling call from a second different zone that the HVAC system 100 provides air to (block 188). In response, the method 164 includes switching the compressor 110 to the cooling mode (block 190), while maintaining the compressors 108, 112 in cooling mode and the compressor 106 in the reheat mode (e.g., at full capacity). As depicted in FIG. 8, refrigerant will flow along the reheat circuit 114 and the cooling circuits 120, 122, 124 as indicated by arrows 170, 174, 182, 176, respectively. With the compressor 110 in the cooling mode, the reheat valve 142, is completely open to enable the entire flow of refrigerant along the cooling circuit 122, while closed to block flow refrigerant along the reheat circuit 116. During the switch of the compressor 110 to the cooling mode, the valve 152 is de-energized, while the valve 154 remains closed.

The method 164 includes, in addition to the previous dehumidification call and the cooling calls from the first and second zones, receiving a cooling call from a third different zone that the HVAC system 100 provides air to (block 192). In response, the method 164 includes ignoring the cooling call from the first zone (block 194) and taking no action. Thus, the controller 156 maintains the compressor 106 in the reheat mode (e.g., at full capacity) and the compressors 108, 110, 112 in the cooling mode.

Figure 9:
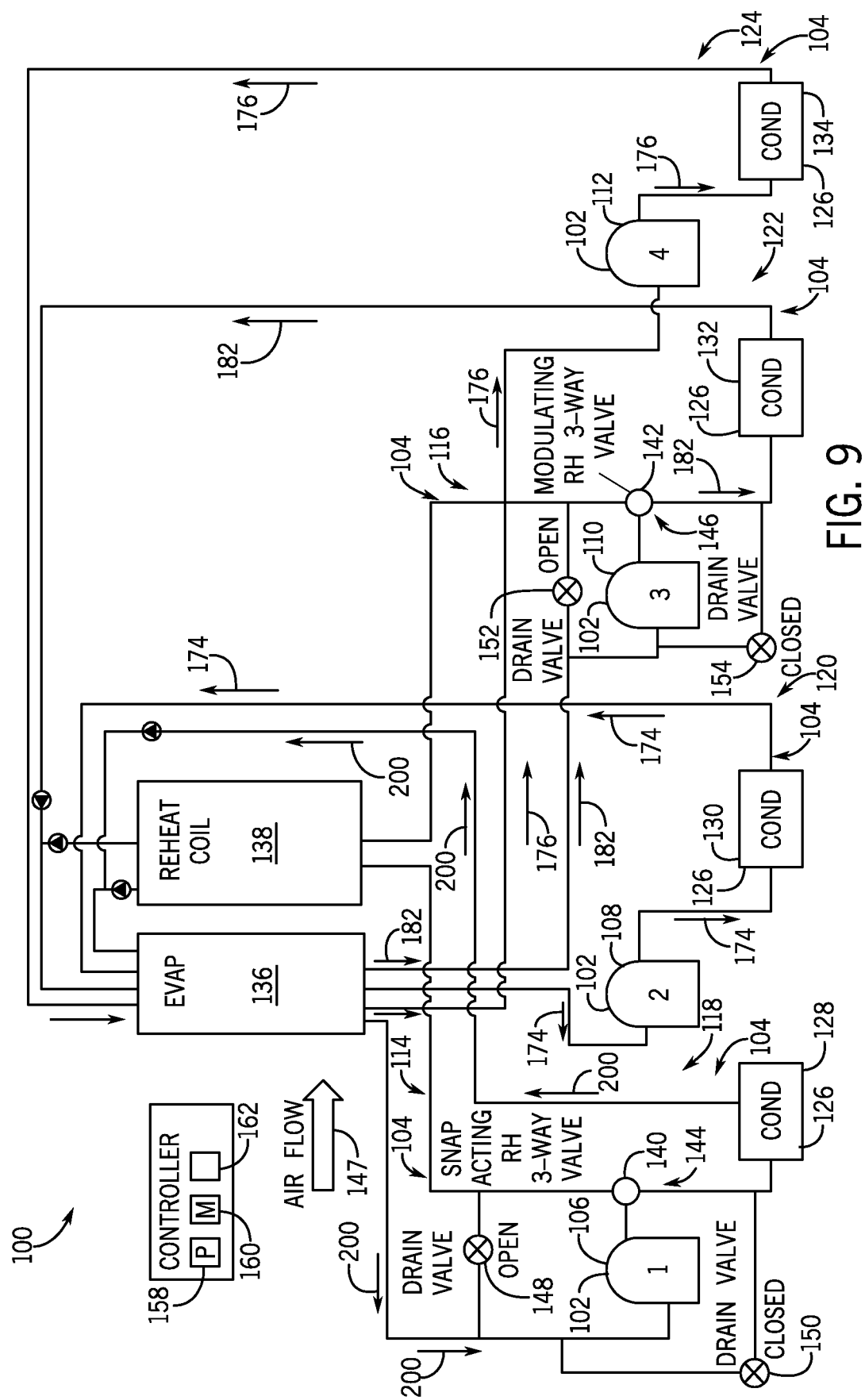
FIG. 9 is a schematic of an embodiment of an HVAC system of FIG. 5 with each compressor in cooling mode, in accordance with aspects of the present disclosure.

The method 164 also includes, in addition to the previous dehumidification call and the cooling calls from the first, second, and third zones, receiving a cooling call from a fourth different zone that the HVAC system 100 provides air to (block 196). In response, the method 164 includes switching the compressor 106 to the cooling mode (block 198), while maintaining the compressors 108, 110, 112 in cooling mode. As depicted in FIG. 9, refrigerant will flow along the cooling circuits 118, 120, 122, 124 as indicated by arrows 200, 174, 182, 176, respectively. With the compressor 106 in the cooling mode, the reheat valve 140, is completely open to enable the entire flow of refrigerant along the cooling circuit 118, while closed to block flow refrigerant along the reheat circuit 114. During the switch of the compressor 106 to the cooling mode, the valve 148 is de-energized to open the valve 148, while the valve 150 is de-energized to close the valve 150.

The method 164 further includes upon the cooling call for the fourth zone being satisfied (while the dehumidification call and the cooling calls from the first, second, and third zones remain), switching the compressor 106 to the heating mode at full operating capacity (block 202), while maintaining the compressors 108, 110, 112 in cooling mode. As depicted, in FIG. 8, refrigerant will flow along the reheat circuit 114 and the cooling circuits 120, 122, 124 as indicated by arrows 170, 174, 182, 176, respectively. During the switch of the compressor 106 to the heating mode, the valve 148 is energized to close the valve 148 and the valve 150 is energized to open the valve 150.

The method 164 includes upon the cooling call for the third zone being satisfied (while the dehumidification call and the cooling calls from the first and second zones remain), maintaining the compressor 106 in the reheat mode and the compressors 108, 110, 112 in the cooling mode (block 204). The method 164 also includes upon the cooling call for the second zone being satisfied (while the dehumidification call and the cooling call from the first zone remain), switching the compressor 110 to reheat mode at full capacity initially and then modulating the reheat mode (e.g., between 0 and 100 percent) upon the reheat valve 142 receiving the modulating signal (block 206). As depicted in FIG. 7, refrigerant will flow along the reheat circuits 114, 116 and the cooling circuits 120 and 124 as indicated by arrows 170, 172, 174, and 176, respectively. With the compressor 110 initially at full capacity, the reheat valve 142 is completely open to enable the entire flow of refrigerant along the reheat circuit 116, while closed to block flow of refrigerant along the cooling circuit 122. Once the modulating signal is sent to the reheat valve 142, the valve 154 is de-energized to close the valve 154 and the compressor 110 is then modulating in the reheat mode. If compressor 110 is operating at less than full capacity, the reheat valve 142 is only partially open to enable a portion of refrigerant to flow along the reheat circuit 116, while the reheat valve 142 is also partially open to enable the remaining portion of refrigerant to flow along the cooling circuit 122 as indicated by arrow 182.

The method 164 further includes upon the cooling call for the fourth zone being satisfied (while the dehumidification call remains), maintaining the compressor 106 in the reheat mode and the compressors 108, 112 in the cooling mode, while modulating the compressor 110 in the reheat mode (block 208). The method 164 even further includes upon the dehumidification call being satisfied, sequentially (e.g., with each step separated by a few seconds) simultaneously switching compressors 108, 122 off, followed by switching the compressor 106 to the cooling mode for cooling operation for a set period of time (e.g., 2 minutes) and then switching off the compressor 106, and finally switching the compressor 110 to cooling for cooling operation for a set period of time (e.g., 2 minutes) and then switching off the compressor 110 (block 210). Subsequent to switching off the compressors 106, 108, 110, 112, the compressors 106, 108, 110, 112 will not respond to any call for a set period of time (e.g., 2 minutes). When the compressor 106 is switched to the cooling mode, the valve 148 is de-energized to open the valve 148 and the valve 150 is de-energized to close the valve 150. When the compressor 110 is switched to the cooling mode, the valve 152 is de-energized to open the valve 152 while the valve 154 remains de-energized and closed.

The enclosure of the present disclosure may provide one or more technical effects useful in modulating a hot gas reheat operation of a HVAC system having plurality of compressors and plurality of refrigeration circuits. For example, the HVAC system may modulate a hot gas reheat sequence utilizing the plurality of compressors and the plurality of refrigeration circuits to provide dehumidification in the absence of a call for cooling. In particular, embodiments of the HVAC system may be configured to utilize the plurality of compressors and the plurality of refrigeration circuits to achieve maximum dehumidification at neutral air by adjusting the supply air for multiple zones towards a neutral point while avoiding the cooling effect that typically occurs in typical HVAC systems (e.g., having a single reheat circuit and a single cooling circuit). Modulation of one of the heat gas reheat valves via the hot gas reheat sequence described above enables the supply air to be adjusted toward the neutral point. In addition, the hot gas reheat sequence with the plurality of compressors and the plurality of refrigeration circuits enables full modulation (i.e., 0 to 100 percent) of the hot gas reheat operation. The technical effects and technical problems in the specification are examples and are not limiting. It should be noted that the embodiments described in the specification may have other technical effects and can solve other technical problems.

While only certain features and embodiments of the disclosure have been illustrated and described, many modifications and changes may occur to those skilled in the art, such as variations in sizes, dimensions, structures, shapes and proportions of the various elements, values of parameters, including temperatures and pressures, mounting arrangements, use of materials, colors, orientations, and so forth without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described, such as those unrelated to the presently contemplated best mode of carrying out the disclosure, or those unrelated to enabling the claimed disclosure. It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A system for modulating hot gas reheat operation of a heating, ventilation, and/or air conditioning (HVAC) system, wherein the HVAC system is configured to regulate air provided to a plurality of zones, comprising:
    a first compressor coupled to both a first hot gas reheat circuit including a reheat coil and a first cooling circuit including a first condenser and an evaporator;
    a second compressor coupled to a second cooling circuit including a second condenser and the evaporator;
    a third compressor coupled to both a second hot gas reheat circuit including the reheat coil and a third cooling circuit including a third condenser and the evaporator;
    a fourth compressor coupled to a fourth cooling circuit including a fourth condenser and the evaporator;
    a first multi-directional reheat valve disposed at a first junction between the first hot gas reheat circuit and the first cooling circuit; and
    a second multi-directional reheat valve disposed at a second junction between the second hot gas reheat circuit and the third cooling circuit.

2. The system of claim 1, comprising a first drain valve and a second drain valve disposed downstream of both the third compressor and the second multi-directional reheat valve.

3. The system of claim 2, wherein the first drain valve and the second drain valve are configured to shift refrigerant between the second hot gas reheat circuit and the third cooling circuit when switching between a reheat mode and a cooling mode.

4. The system of claim 2, wherein when the third compressor is energized in the reheat mode initially at full capacity, the first drain valve is closed, and the second drain valve is open until the second multi-directional reheat valve receives a modulating signal and then the second drain valve is subsequently closed.

5. The system of claim 1, wherein when a temperature of a supply air is not at a neutral temperature, the second multi-directional reheat valve is configured to adjust a capacity of a reheat mode of the third compressor.

6. The system of claim 1, comprising a third drain valve and a fourth drain valve disposed downstream of both the first compressor and the first multi-directional reheat valve.

7. The system of claim 6, wherein the third drain valve and the fourth drain valve are configured to shift refrigerant between the first hot gas reheat circuit and the second cooling circuit.

8. A system for modulating hot gas reheat operation of a heating, ventilation, and/or air conditioning (HVAC) system, wherein the HVAC system is configured to regulate air provided to a plurality of zones, the system comprising:
- a reheat coil;
- a plurality of hot gas reheat circuits, wherein each hot gas reheat circuit of the plurality of reheat circuits includes the reheat coil;
- an evaporator;
- a plurality of cooling circuits, wherein each cooling circuit of the plurality of reheat circuits includes a respective condenser and the evaporator;
- a plurality of compressors, wherein each compressor of the plurality of compressors is coupled both to a respective hot gas reheat circuit of the plurality of hot gas reheat circuits and a respective cooling circuit of the plurality of cooling circuits; and
- a plurality of multi-directional reheat valves disposed at different junctions between the plurality of hot gas reheat circuits and the plurality of cooling circuits.

9. The system of claim 8, wherein the plurality of cooling circuits comprises a first cooling circuit and a second cooling circuit, and wherein the plurality of hot gas reheat circuits comprises a first hot gas reheat circuit and a second hot gas reheat circuit.

10. The system of claim 9, wherein the plurality of multi-directional reheat valves comprises a first multi-directional reheat valve disposed at a first junction between the first hot gas reheat circuit and the first cooling circuit, and a second multi-directional reheat valve disposed at a second junction between the second hot gas reheat circuit and the second cooling circuit.

11. The system of claim 10, wherein the plurality of compressors comprises a first compressor and a second compressor.

12. The system of claim 11, wherein the first compressor is coupled to both the hot gas reheat circuit and the first cooling circuit, and the second compressor is coupled to both the second hot gas reheat circuit and the second cooling circuit.

13. The system of claim 12, comprising a first drain valve and a second drain valve disposed downstream of both the second compressor and the second multi-directional reheat valve.

14. The system of claim 13, wherein the first drain valve and the second drain valve are configured to shift refrigerant between the second hot gas reheat circuit and the second cooling circuit when switching between a reheat mode and a cooling mode.

15. The system of claim 14, wherein the first drain valve is configured to be closed, and the second drain valve is configured to be open when the second compressor is energized in the reheat mode initially at full capacity, until the second multi-directional reheat valve receives a modulating signal and then the second drain valve is subsequently configured to be closed.

16. The system of claim 13, comprising a third drain valve and a fourth drain valve disposed downstream of both the first compressor and the first multi-directional reheat valve.

17. The system of claim 16, wherein the third drain valve and the fourth drain valve are configured to shift refrigerant between the first hot gas reheat circuit and the first cooling circuit.

18. The system of claim 12, wherein the second multi-directional reheat valve is configured to adjust a capacity of a reheat mode of the second compressor based on a temperature of a supply air not being at a neutral temperature.

19. A system for modulating hot gas reheat operation of a heating, ventilation, and/or air conditioning (HVAC) system, wherein the HVAC system is configured to regulate air provided to a plurality of zones, the system comprising:
- a plurality of compressors; and
- a multi-directional reheat valve; and
- wherein in response to a call for dehumidification in the absence of a call for cooling, the plurality of compressors are configured to be sequentially energized with a first compressor of the plurality of compressors energized in a reheat mode, a second compressor of the plurality of compressors energized in a cooling mode, a third compressor of the plurality of compressors energized in a reheat mode initially at full capacity, and a fourth compressor of the plurality of compressors energized in a cooling mode, and wherein, when the third compressor is energized in the reheat mode initially at full capacity and when a temperature of supply air is not at a neutral temperature, the multi-directional reheat valve is configured to adjust a capacity of the reheat mode of the third compressor in response to a modulating signal.

20. The system of claim 19, wherein the first compressor is coupled to both a first hot gas reheat circuit including a reheat coil and a first cooling circuit including a first condenser and an evaporator, the second compressor is coupled to a second cooling circuit including a second condenser and the evaporator, the third compressor is coupled to both a second hot gas reheat circuit including the reheat coil and a third cooling circuit including a third condenser and the evaporator, and the fourth compressor is coupled to a fourth cooling circuit including a fourth condenser and the evaporator, and wherein the multi-directional reheat valve is disposed at a junction between the second hot gas reheat circuit and the third cooling circuit.

* * * * *